UNITED STATES PATENT OFFICE.

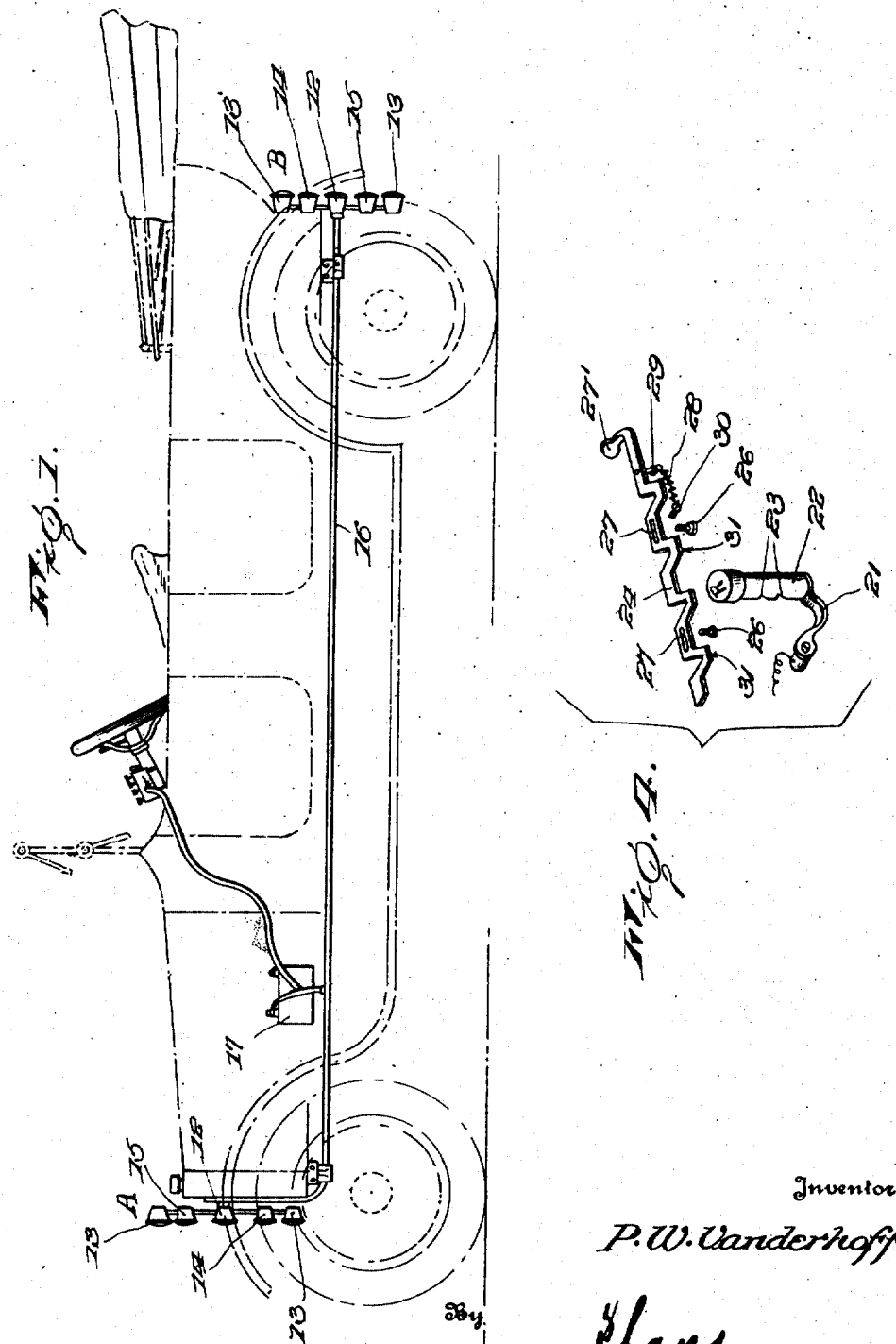

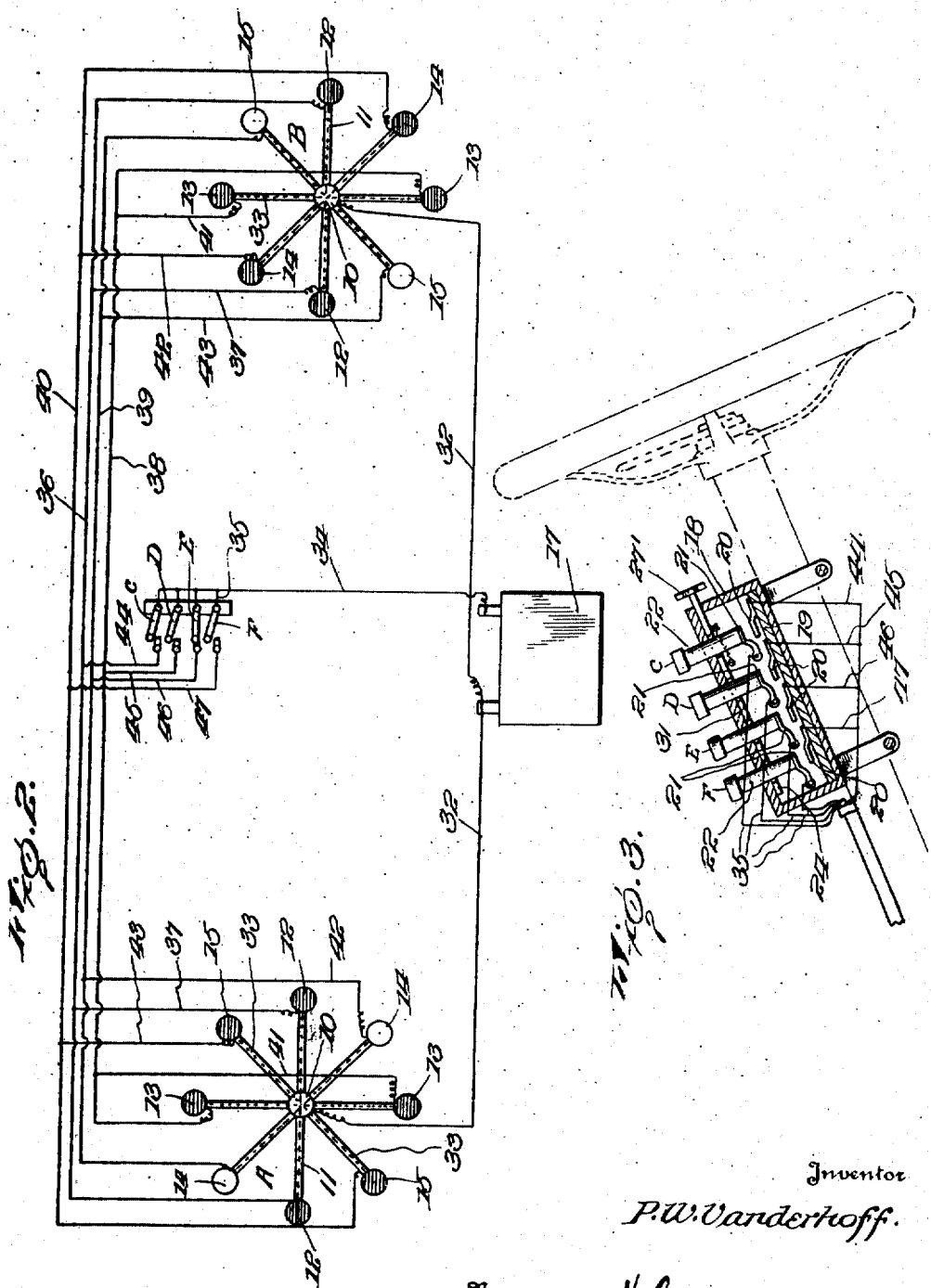

PAUL W. VANDERHOFF, OF TOPEKA, KANSAS.

SWITCH FOR MOTOR-VEHICLE SIGNALING DEVICES.

1,303,423. Specification of Letters Patent. Patented May 13, 1919.

Original application filed February 27, 1917, Serial No. 151,318. Divided and this application filed December 31, 1917. Serial No. 209,691.

*To all whom it may concern:*

Be it known that I, PAUL W. VANDERHOFF, a citizen of the United States, residing at Topeka, in the county of Shawnee and State of Kansas, have invented certain new and useful Improvements in Switches for Motor-Vehicle Signaling Devices, of which the following is a specification.

This invention relates to an improved electric switch particularly designed for use in connection with vehicle signaling devices, being a division of my pending application for signal device for vehicles, filed February 27, 1917, Serial Number 151,318.

The invention has as its primary object to provide a switch for controlling the electrical circuits of a signal system whereby a driver of a vehicle may indicate an intention to proceed directly ahead, to turn either to the right or left, or to stop, by the selective energization of certain electric signal lights.

A further object of the invention is to provide a switch structure by means of which any desired pair of lights of a front signal mechanism for the vehicle and a corresponding pair of lights of a rear signal mechanism for the vehicle may be simultaneously energized.

And a still further object of the invention is to provide a switch of the above described character which may be mounted upon the steering column of the vehicle and so constructed that the actuation of the switch to give one signal will automatically break the circuit of any other signal then displayed.

Other and incidental objects will appear as the description proceeds, and in the drawings wherein I have illustrated the preferred embodiment of the invention, and wherein similar reference characters designate corresponding parts throughout the several views:

Figure 1 is a side elevation showing a conventional type of motor vehicle equipped with my improved switch and illustrating the arrangement of the signals at the front and rear of the vehicle, controlled by the switch.

Fig. 2 is a diagrammatic view showing the wiring system employed in connection with the switch for controlling the front and rear signal mechanism of the vehicle.

Fig. 3 is a sectional view showing the switch in detail and illustrating the manner in which the switch is mounted upon the steering column of the vehicle, and Fig. 4 is an unassembled perspective view of certain of the switch elements.

As previously intimated, the switch of the present invention is particularly designed for use in connection with a motor vehicle signaling mechanism of the type shown in my pending application referred to. Accordingly, I have, in order that the construction and operation of the switch may be accurately understood, shown the switch, in the present instance, in connection with such signaling mechanism. Briefly stated, this signaling mechanism includes a signal device A adapted to be mounted at the front of a motor vehicle, as shown in Fig. 1 of the drawings, and a similar signal device B adapted to be mounted in the rear of the vehicle. The vehicle shown is of conventional form. Each of the said signal devices is formed with a hollow hub 10 from which extend a plurality of tubular radial arms 11 which are preferably eight in number. For convenience, any arm and that arm extending opposite to it will be termed a pair of arms and the signals carried by them will be termed a pair of signals. Mounted upon the outer extremities of the arms are signals each in the form of a lamp casing and inclosing an electric light bulb. One pair of signals is indicated at 12, another pair at 13, another pair at 14, and the remaining pair at 15. The various signals given by the device consist in the selective lighting of the different pairs of lamps. The signals 12 indicate an intention to proceed straight ahead; the signals 13 indicate an intention to stop; the signals 14 indicate an intention to turn to the right; while the signals 15 indicate an intention to turn to the left. The wires to the light bulbs of the several signals are preferably carried into the hub 10 and through the tubular arm 11 to the electric light bulbs. The front signaling device A is supported upon the vehicle in any convenient manner while the rear signaling device B is supported upon a pipe 16 extending beneath the vehicle and forming a conduit for the wires leading from the lights of the said devices. Any suitable source of electric energy, such as a storage battery 17, may be employed for energizing the lights.

Coming now more particularly to the switch of the present invention, I employ a switch box or casing 18 which is provided with a false bottom 19 of insulating material. This false bottom carries a plurality of spaced spring contacts 20 each of which is engageable by a coöperating spring contact 21 supported within the box. The spring contacts 20 and 21 in each instance are normally held out of engagement with each other and each spring contact 21 is movable into engagement with its contact 20 by pressure exerted against the former contact by a plunger 22 reciprocally mounted in the top wall of the casing. The plungers 22 are preferably fixed to the spring contacts 21 so that they will be held against disengagement from the casing as well as against turning movement. Formed in one face of each of the plungers is a pair of spaced tangentially extending notches 23.

Mounted beneath the top wall of the casing is a slide 24 supported by a pair of screws 26 loosely passed through slots 27 in the slide and holding the slide against the inner face of the said wall. One end of this slide projects through the adjacent end of the casing and has a finger key 27 by which the slide may be reciprocated. A helical spring 28 is connected at one end to a depending lug or finger 29 carried by the slide and at its opposite end to a stud 30 projecting from the adjacent wall of the casing. As will be clear this spring will thus normally hold the slide in extended position. The slide at points normally opposite each plunger 22 is formed with projecting portions 31, the lateral edges of which are adapted to seat in one or the other of the notches 23 of the different plungers 22 according to whether such plungers are in extended or depressed position. This slide will, therefore, serve to semi-positively lock the plungers in extended position and also to semi-positively lock any depressed plunger in its depressed position. The notches in the plungers are beveled so that any plunger may be depressed without interference from the slide, the slide being merely moved against the action of its spring until the upper notch of said plunger comes into a line with the slide, when the said slide snaps back into place to lock such depressed plunger and to again lock the remaining projected plungers. Obviously, the depression of any plunger, therefore, moves the slide in such manner that it will release any plunger previously locked in depressed position. These plungers and their correlated contacts provide a plurality of switch members which are adapted to control the circuits to the pairs of signals 12, 13, 14 and 15 respectively. By means of these switch members any desired light circuit or combinations of light circuits may be closed and all other circuits which were previously closed will be automatically opened. At the same time, any circuit or circuits closed may, by manual extension of the slide through its release key 27′, be opened without the closing of any other circuit. To avoid mistake the switch keys are preferably inscribed to indicate the respective circuits which the different keys control.

In order that the operation of the switch, as just above described, may be correctly understood I have, in Fig. 2 of the drawings, further disclosed a preferred form of wiring for the signaling system. As there shown, wires 32 lead from one of the binding posts of the battery 17 to the hubs 10 of the signaling devices A and B and branch wires 33 lead from the ends of the wires 32 through the arms of the signals to one contact of each light socket therein so that one contact of each light socket is always in electrical connection with one binding post of the battery. A wire 34 leads from the other post of the battery and branch wires 35 lead from the wire 34 to the plunger actuated contacts 21 of the switch members. A wire 36 connects the free contact of the socket of one of the signals 12 of the front signaling device with the free contact of the corresponding light socket of the rear signaling device while wires 37 connect the free contacts of the sockets of the other signals 12 with the wire 34. In like manner wires 38, 39 and 40 connect the free contacts of the sockets of one of the signals 13, 14 and 15 of the front signaling device with one of the corresponding signals of the rear signaling device, and wires 41, 42 and 43 connect the free contacts of the remaining signals 13, 14 and 15 with the wires 38, 39 and 40 respectively. For convenience the different switch members are indicated at C, D, E and F respectively. A wire 44 connects the contact 20 of the switch member C with the wire 36 and wires 45, 46 and 47 connect the corresponding contacts of the switch members D, E and F respectively with the wires 38, 39 and 40. It will thus be seen that closing the switch C will close a circuit through all of the signals 12 to consequently give a signal at both the front and rear of the vehicle of the driver's intention to proceed straight ahead. In like manner, closing the switch member D will energize all of the signals 13 to consequently give a signal of the driver's intention to stop, while closing of the switch members E or F will energize the signals 14 or 15 to indicate an intention on the part of the driver to turn to the right or to the left, as the case may be. It will, therefore, be seen that I have provided a particularly efficient form of switch for the purpose set forth and, as illustrated in the drawings, the said switch is preferably mounted upon the steering column of the vehicle where the switch will be easily accessible. However, if so desired, the switch may be otherwise located.

Having thus described the invention, what is claimed as new is:

1. A selective switch for signals including a casing, a plurality of contacts in the casing, a plurality of spring contacts each movable into engagement with one of the first contacts, operating plungers for moving the spring contacts, said plungers projecting into the casing and being connected to the spring contacts to be held thereby against displacement from the casing, a slide, and an operative engagement between the slide and plungers whereby depression of any plunger will automatically lock such plunger in depressed position and cause release of any plunger previously depressed.

2. A selective switch for signals including a casing, a plurality of spring contacts mounted within the casing and each movable for closing a circuit therethrough, operating plungers projecting into the casing and each connected to one of said spring contacts to be held thereby against displacement from the casing, the plungers being operable for moving the spring contacts selectively, and means for locking the plungers in depressed position.

In testimony whereof I affix my signature.

PAUL W. VANDERHOFF. [L. S.]